United States Patent [19]

Manzoni

[11] 4,264,143

[45] Apr. 28, 1981

[54] DEVICE FOR ADJUSTING A REAR VIEW MIRROR

[76] Inventor: Stéphane Manzoni, 1, rue Pasteur, Saint-Claude, France, 39200

[21] Appl. No.: 60,526

[22] Filed: Jul. 25, 1979

[30] Foreign Application Priority Data

Jul. 27, 1978 [FR] France ............................ 78 22276

[51] Int. Cl.³ .............................................. G02B 7/18
[52] U.S. Cl. ................................. 350/289; 75/501 M
[58] Field of Search ............................ 350/289, 307; 74/471 XY, 501 M; 248/487

[56] References Cited

FOREIGN PATENT DOCUMENTS 2380166 9/1978 France ................................. 74/501 M Primary Examiner—Jon W. Henry

[57] ABSTRACT

The invention relates to a device for adjusting a rear view mirror, particularly for a vehicle, comprising a support member fixed on the gusset plate of a door of the vehicle and passing therethrough in order to allow passage of the control members inside the vehicle for adjusting the orientation of a rear view mirror casing and mirror about a vertical axis and a horizontal axis. The central shaft presents, on the side opposite the first maneuvering member, a pinion which meshes with a toothed wheel fast with a spiral cam of which the contour is maintained in contact with a boss provided on an extension of the cylindrical body. The invention is used for adjusting a rear view mirror of a vehicle.

10 Claims, 11 Drawing Figures

DEVICE FOR ADJUSTING A REAR VIEW MIRROR

The present invention relates to a device for adjusting a rear view mirror, particularly for a vehicle.

French Pat. No. 77 03979, publication No. 2,380,166, B.O.P.I. Listes No. 36 of Sept. 8, 1978, relates to a device for adjusting a rear view mirror, particularly for a vehicle, comprising a support member fixed on the gusset plate of a vehicle door and passing therethrough in order to allow passage of the members inside the vehicle for adjusting the orientation of a rear view mirror casing and mirror about a vertical axis and a horizontal axis. In the support member, a cylindrical body is mounted to pivot about a horizontal axis, said cylindrical body having at one of its ends a fixing means on which the casing of the rear view mirror is mounted to pivot about a vertical axis, said body comprising a central bore in which is rotatably mounted a shaft provided at one of its ends with a first manoeuvering member and at its other end with means for driving said body about a horizontal axis, said body presenting two lateral bores in which are slidably mounted two parallel rods connected at one of their ends to a second manoeuvring member and in abutment at their other end against the faces of a control member connected to the casing about a vertical axis.

To obtain the "up and down" tilting about the horizontal axis of pivoting, French Pat. No. 77 03979 uses a pinion mounted at the end of the central rod and which meshes with a toothed wheel mounted to rotate on the support member and presenting an eccentric crank pin on which is mounted a slide member moving in a groove provided in an extension of the cylindrical body.

However, despite the care and precision exercised in making this device and the necessary tolerances of the different parts, it is very difficult to obtain an absence of minimum "up and down" tilting of the casing of the rear view mirror, even under the effect of a slight manual stress, and this results in a misadjustment of the mirror.

It is an object of the present invention to provide an improvement to the device, which enables this drawback to be overcome.

In accordance with the present invention, the central shaft presents on the side opposite the first manoeuvering member, a pinion which meshes with a toothed wheel fast with a spiral cam of which the contour is maintained in contact with a boss provided on an extension of the cylindrical body.

With this arrangement, the rear view mirror, upon an outer manual thrust, remains in fixed position in one direction and it moves and returns to initial position under the effect of an elastic member when the thrust ceases in the other direction. Consequently, the device is fool-proof and irreversible.

Furthermore, two turns must be made of the first manoeuvering member for the "up and down" tilting in the same direction, the cam making a complete revolution, this resulting in a finer and smoother adjustment than with the prior device in which only one turn of the manoeuvering member was necessary.

Finally, the thrust of the elastic member enables the clearance between the spans of the support member and of the cylindrical body to be taken up. This undesirable clearance which produces vibrations of the rear view mirror being eliminated with the improved device, it is possible to use less strict machining tolerances and to eliminate the vibrations.

According to another feature of the invention, there is provided on the central shaft which comprises a pinion meshing with the toothed wheel fast with the spiral cam, a first transmission member which meshes with another transmission member fast with a drive cable and a second transmission member meshes with a transmission member fast with another drive cable, the second transmission member being fast with a pinion which meshes with two pinions fixed to one of the ends of threaded screws of opposite thread engaged in tapped parts of the cylindrical body, the other end of the two threaded screws coming into abutment against the end of two push members sliding freely in bores of the cylindrical body, and of which the other end acts on a connecting member fast with the casing.

Furthermore, the flexible cables may be driven manually by means of a manoeuvering knob or an electric gear-down motor.

The invention will be more readily understood on reading the following description with reference to the accompanying drawings, in which.

Figure 1:
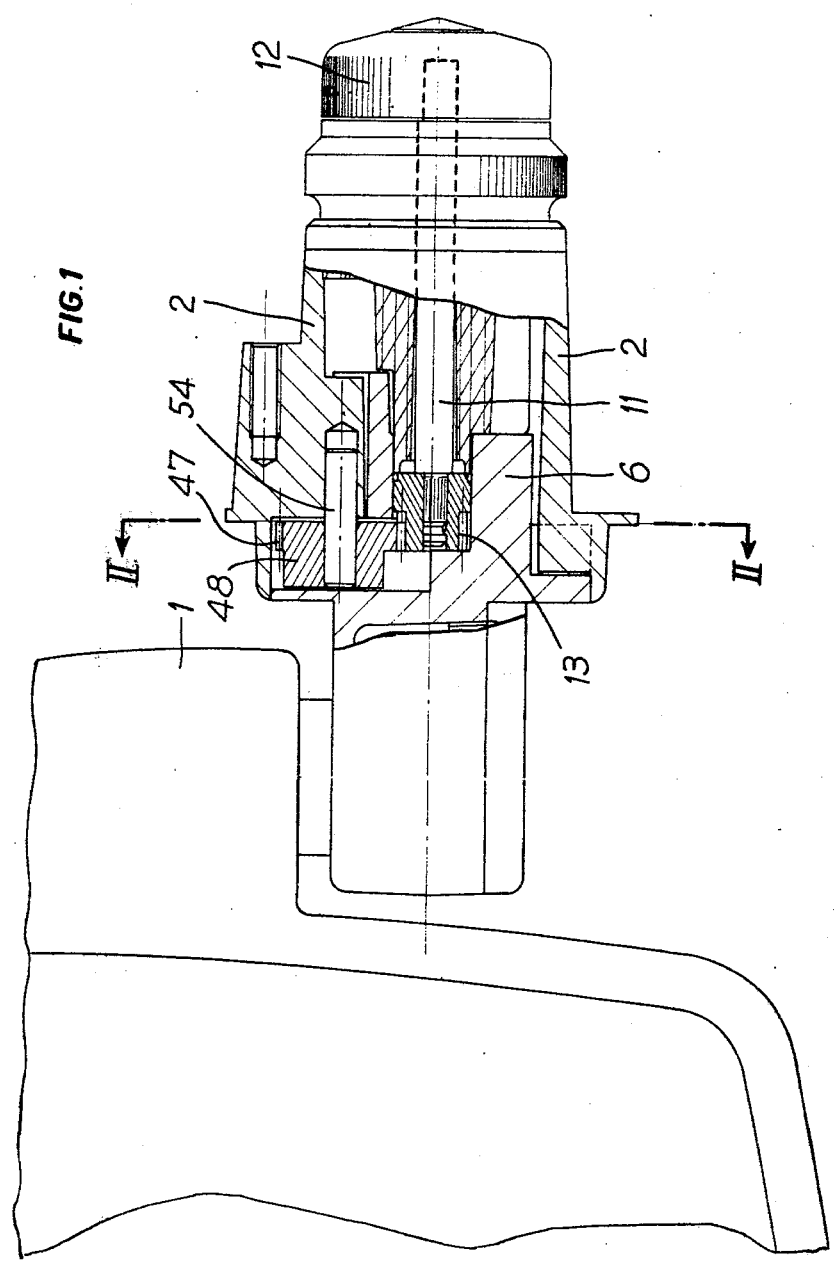
FIG. 1 is a view in longitudinal section of an embodiment of the device for adjusting a rear view mirror.
Figure 2:
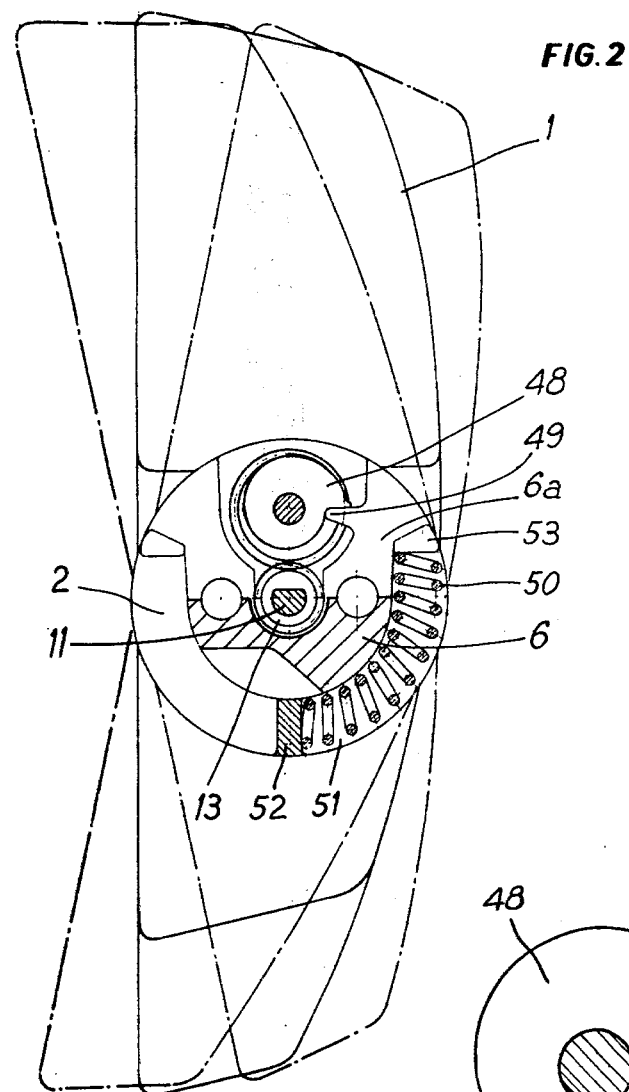
FIG. 2 is a view in section along line II—II of FIG. 1.

Referring now to the drawings, FIGS. 1 and 2 show an embodiment of the device for adjusting a rear view mirror, which comprises the same elements as the device forming the subject matter of French Pat. No. 77 03979, except concerning the means for tilting the casing up and down by pivoting it about a horizontal axis.

Figure 3:
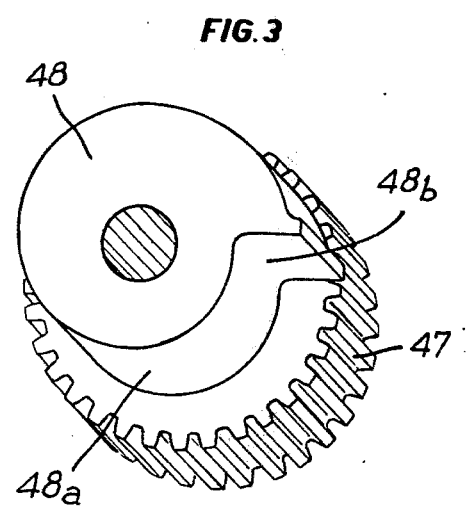
FIG. 3 is a view in perspective of the spiral cam.
Figure 4:
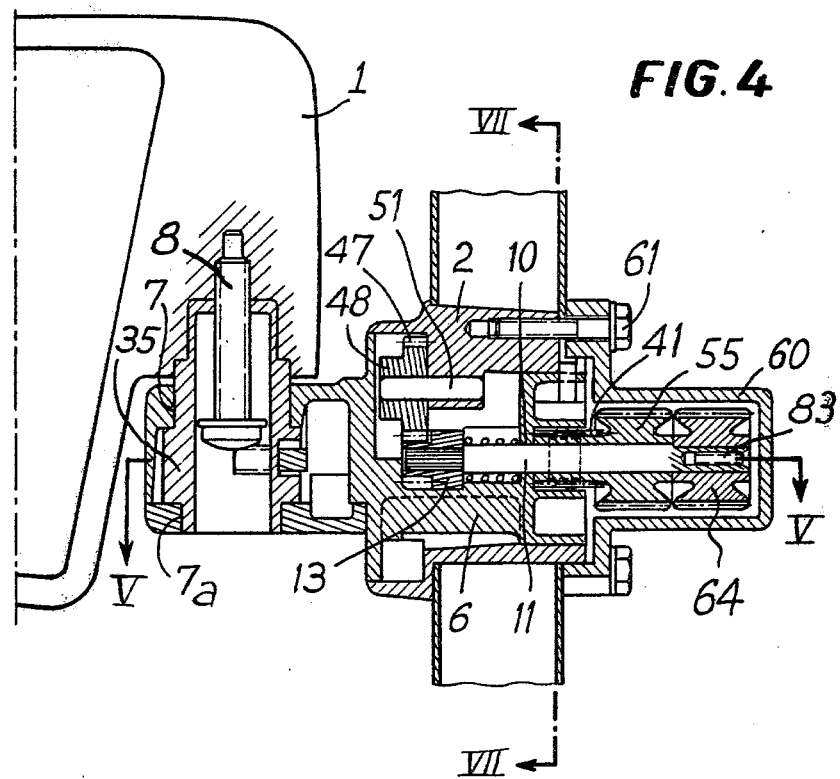
FIG. 4 is a view in elevation and in longitudinal section of an improved embodiment of the device for adjusting a rear view mirror.

On one of the ends of the central shaft 11 opposite the one on which is fixed the first manoeuvering member 12, a pinion 13 is keyed which meshes with a toothed wheel 47 mounted to rotate on a shaft 54 fixed on the support member 2, said toothed wheel being fast with a spiral cam 48 (FIGS. 2,3) of which the contour 48a is maintained in contact with a boss 49 of the cylindrical body 6, under the action of a helical spring 50. This spring 50 which is disposed in an arcuate housing 51, made between the cylindrical body 6 and the support member 2, is in abutment on one side against a wall 52 of the support member 2 and on the other side against a wall 53 of the cylindrical body 6. The cam 48 comprises a radial face 48b between the two ends of its contour 48a in spiral form, said face constituting a stop member for the boss 49.

In operation, the boss 49 of the cylindrical body 6, on which the casing 1 of the rear mirror is mounted, is in abutment under the action of the spring 50 against the contour 48a of the spiral cam 48, so that a rotation of the cam, by means of the toothed wheel 47 and the pinion 13 actuated by the manoeuvering member 12, brings about an angular displacement of the cylindrical body 6 about the horizontal axis and, consequently, an angular "up and down" tilting of the casing of the rear view mirror, as shown in FIG. 2.

The vehicle moving forwards, the casing of the rear view mirror, under the thrust of the wind, reinforces the abutment of the spring 50, the body 6 being in abutment on the profile on the cam 48. It would also be possible to eliminate the spring 50 by ensuring a suitable connection between the body 6 and the cam 48, in order to have a drive in both directions.

FIGS. 4,5,6 and 7 show another embodiment of the device for adjusting a rear view mirror. This adjusting device comprises a tubular support member 2 passing through the gusset plate of a vehicle door on which said support member 2 is held by a casing 60 fixed by means of screws 61 on the support member.

The support member 2 presents a bore 5 in which is pivotally mounted a cylindrical body 6 presenting at one of its ends two bearings 7, 7a in which is pivotally mounted a connecting member 35 on which is fixed a rear view mirror casing 1 comprising a mirror, by means of a screw 8.

The body 6 presents a central bore 10 in which a shaft 11 is mounted to rotate, which shaft, as has been described hereinabove, carries at one of its ends a pinion 13 which meshes with a toothed wheel 47 fast with the cam 48. At its other end, the shaft 11 carries a tangential wheel 64 which is fixed thereon by means of a screw 83 and which meshes with an endless screw 65 rotating with a flexible transmission cable. The pinion 13 is subjected to the action of a spring 74 in abutment against the cylindrical body 6.

The connecting member 35 on which the casing 1 of the rear view mirror is mounted for pivoting thereof about a vertical axis is obtained by means of push members 24, 24a which are in abutment by their hemispherical end against the faces 34, 34a of the connecting member 35.

The other end of the push members 24–24a comes into abutment on the end of the two screws 43–43a of opposite thread, engaged in corresponding tapped holes, provided in the cylindrical body 6. One of the push members 24 is divided into two elements 24, 24' between which a spring 44 is disposed.

Figure 6:
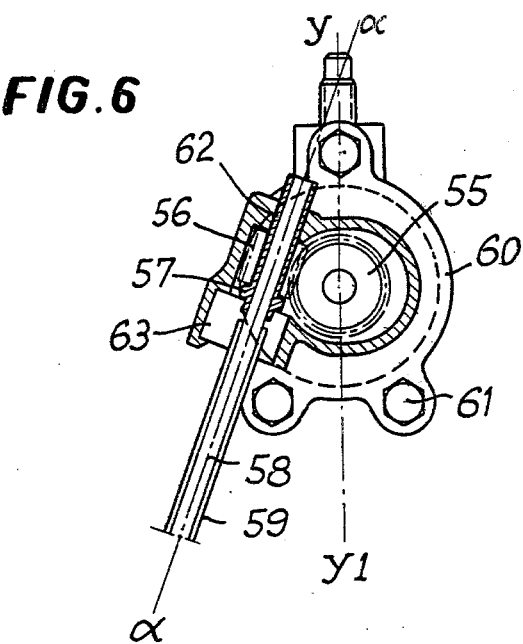
FIG. 6 is a view in section along line VI—VI of FIG. 5.
Figure 7:
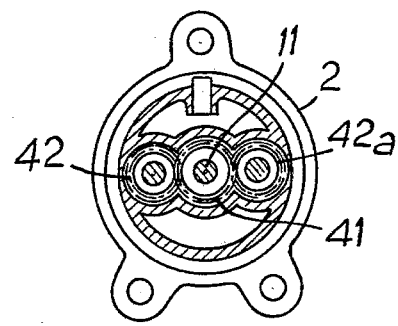
FIG. 7 is a view in section along line VII—VII of FIG. 4.

At their end opposite the connecting member 35, the threaded screws 43, 43a are provided with pinions 42, 42a which mesh with a central pinion 41 mounted to rotate on the central shaft 11. The pinion 41 is fast with a tangential wheel 55 which extends the pinion 41 and which meshes with an endless screw 56 fixed via a hollow shaft 57 on a flexible cable 58 disposed in a sheath 59 (FIG. 6).

The shaft 57 is mounted to rotate on one side in a bore 62 of the casing 60 and on the other side in a bearing 63 fixed on said casing.

The casing 60 contains the tangential wheel 55 and the identical tangential wheel 64 which is fixed to one of the ends of the shaft 11.

The flexible cables such as 58 may be driven manually by means of a knob (not shown) fixed to one of the ends of said cables.

If the cable 58 fast with the endless screw 65 is actuated, the tangential wheel 64, the shaft 11, the pinion 13 and the toothed wheel 47 fast with the cam 48 are driven in rotation. As has been described hereinabove, the cam 48, during its rotation, brings about an angular displacement of the cylindrical body 6 about the horizontal axis and consequently an angular "up and down" tilting of the rear view mirror casing as shown in FIG. 2.

Figure 5:
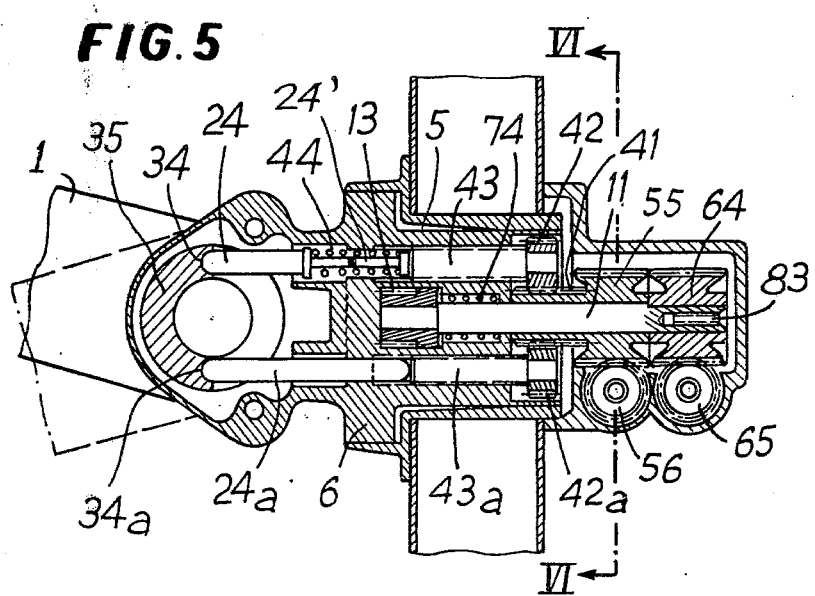
FIG. 5 is a view in section along the line V—V of FIG. 4.

To obtain the rotation of the rear view mirror about the vertical axis, a rotation is imparted on the cable 58 fast with the endless screw 56 which rotates, by the tangential wheel 55, the pinion 41 and the pinions 42, 42a. As the push members 24, 24a are in abutment against the screws 43, 43a of contrary thread, engaged in tapped holes, this results in a displacement of the push members 24, 24a which act by an inverse axial movement on the faces 34, 34a of the connecting member 35, this latter rotating the rear view mirror casing 1 about a vertical axis in an angular "left-right" displacement, as shown in FIG. 5.

Figure 8:
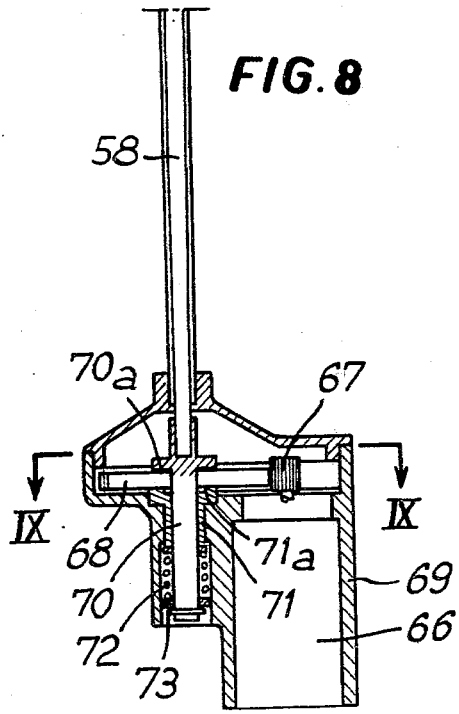
FIG. 8 is a view in section along line VIII—VIII of FIG. 9 of the control device employing gear-down motor.
Figure 9:
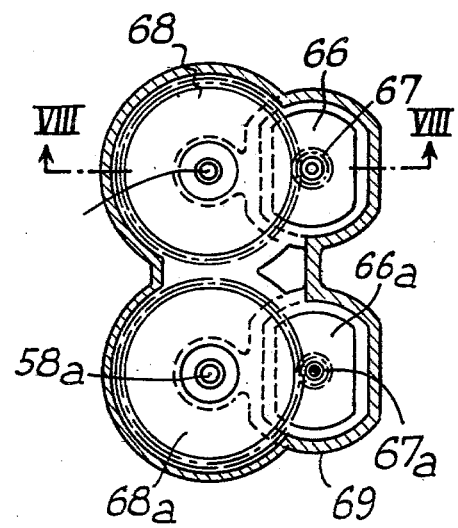
FIG. 9 is a view in section along line IX—IX of FIG. 8.

According to another embodiment shown in FIGS. 8 and 9, the cables 58, 58a are driven by means of electric motors 66, 66a via a pair of pinions 67, 68 and 67a, 68a to reduce the speed communicated to the cables 58, 58a which drive the endless screws 55 and 64.

The assembly thus constituted by the motors and the pinions is mounted in a casing 69.

As shown in FIG. 8, each cable is driven via a torque limiter which is constituted by a shaft 70 fast with the transmission cable 58, 58a and on which the pinion 68, 68a is mounted to rotate freely, said pinion being held tight between a shoulder 70a of the shaft 70 and a shoulder 71a of a sleeve 71 mounted to slide on the shaft 70 and subjected to the action of a spring 72 in abutment against a washer 73 fixed to the shaft 70.

Figure 10:
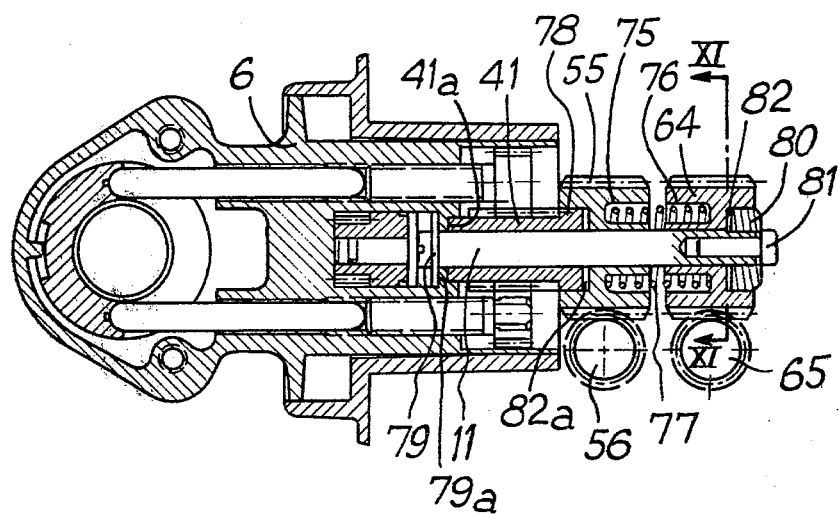
FIG. 10 is a view in section similar to that of FIG. 5, but with a torque limiting device on the tangential wheels.
Figure 11:
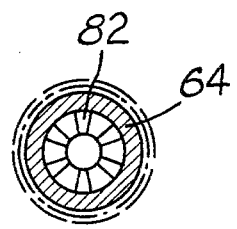
FIG. 11 is a view in section along line XI—XI of FIG. 10.

According to another embodiment shown in FIGS. 10 and 11, the torque limiter is disposed at the level of the tangential wheels 55 and 64 which are mounted to slide and to rotate freely on the central shaft 11. The wheels 55–64 present chambers 75, 76 in which is engaged a compression spring 77 so that the wheels 55 and 64 are pushed respectively against a shoulder 78 of the pinion 41, itself in abutment against the face 41a of the body 6 and against a stop 80 fixed by means of a screw 81 to the end of the shaft 11. The special stop washer 79 positioned on the shaft 11 receives the axial thrust of the spring 77 in abutment at 79a on the bore of the body 6. The stop 81 and the shoulder 78 comprise dog members 82, 82a which cooperate with corresponding dog members provided on the faces of the tangential wheels in contact.

What is claimed is:

1. In a device for adjusting a rear view mirror, particularly for a vehicle, comprising a support member fixed on the gusset plate of a vehicle door and passing therethrough in order to allow passage of the control members inside the vehicle for adjusting the orientation of a rear view mirror casing and mirror about a vertical axis and a horizontal axis, said support member internally comprising a cylindrical body mounted to pivot about a horizontal axis and presenting at one of its ends a fixing means on which the rear view mirror casing is pivotally mounted about a vertical axis, said body comprising a central bore in which a shaft is rotatably mounted, said shaft being provided at one of its ends with a first manoeuvring member and at its other end with means for driving said body about a horizontal axis, said body presenting two lateral bores in which are slidably mounted two parallel rods connected at one of their ends to a second manoeuvring member and in abutment at their other end against the faces of a control member connected to the casing about a vertical axis, the central shaft presents, on the side opposite the first manoeuvering member, a pinion which meshes with a toothed wheel fast with a spiral cam of which the contour is maintained in contact with a boss provided on an extension of the cylindrical body.

2. The device of claim 1, wherein the cylindrical body is subjected to the action of an elastic member in abutment against the support member and pushing the boss against the spiral cam.

3. The device of claim 2, wherein between the support member and the cylindrical body, an arcuate housing is arranged in which is disposed a helical spring in abutment at one of its ends against one of the walls of the support and, on the other side, against a face of the cylindrical body.

4. The device of claim 1, wherein on the central shaft which comprises a pinion meshing with the toothed wheel fast with the spiral cam, there is provided a first transmission member which meshes with another transmission member fast with a drive cable and a second transmission member meshes with a transmission member fast with another drive cable, the second transmission member being fast with a drive pinion which meshes with two pinions fixed to one of the ends of two threaded screws of opposite thread, engaged in the tapped parts of the cylindrical body and which, via two push members in abutment on the end of the two threaded screws, act on a connecting member fast with the case of the rear view mirror.

5. The device of claim 4, wherein the transmission members are constituted by a tangential wheel and an endless screw on which is fixed a flexible transmission cable via a crimped hollow shaft.

6. The device of claim 5, wherein the transmission cables are actuated manually by means of a manoeuvring knob fixed at the end of each cable.

7. The device of claim 5, wherein each cable is driven by an electric gear-down motor.

8. The device of claim 7, wherein the drive pinion of the transmission cable is provided with a torque limiter which is constituted by a shaft fast with the transmission cable and on which the drive pinion is mounted to rotate freely, the drive pinion being held tight between a shoulder of said shaft and a shoulder of a sleeve subjected to the action of an elastic member.

9. The device of claim 7, wherein the tangential wheels are mounted to slide in free rotation on the central shaft and are pushed under the action of an elastic member, respectively against a stop fast with the central shaft and against a shoulder of the pinion driving the threaded rods, said stop and said shoulder comprising dog members which cooperate with corresponding dog members provided on the faces of the tangential wheels in contact and of which a stop washer fast with the central shaft allows the elastic connection of the dog members.

10. The device of claim 1, wherein one of the parallel rods is constituted by two elements between which is disposed an elastic member under compression.

* * * * *